2,929,987

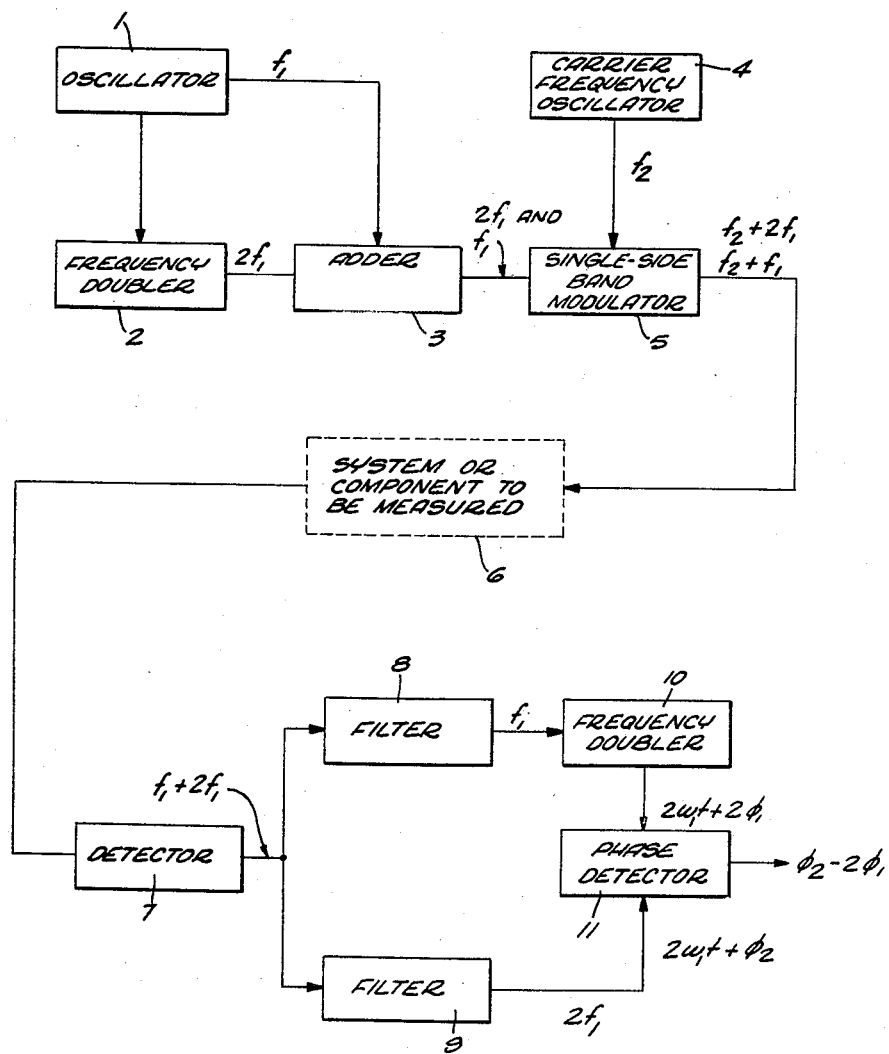

SYSTEM FOR MEASURING DIFFERENTIAL PHASE DELAY IN ELECTRICAL APPARATUS

Albert Royal Noland, La Crescenta, and Homer Gold Tasker, Sherman Oaks, Calif., assignors to Gilfillan Bros., Inc., Los Angeles, Calif., a corporation of California Application September 26, 1955, Serial No. 536,375

7 Claims. (Cl. 324—57)

Our present invention relates to a method of and a system for measuring or determining the differential delay in phase impressed upon electric waves of different frequencies in passing through a piece of apparatus. The term "wave" is employed since the electrical phenomenon to be examined must be periodically alternating, or there can be no question of phase, and the term is used to include waves of either voltage or current. The apparatus to be tested may be a circuit, a transmission line, a cable, or any component useful in the electrical art in connection with alternating electrical phenomena.

We set ourselves the objective of devising testing means of the kind specified that is simpler and less subject to error by frequency drift of oscillators, etc., than some prior art systems with which we are conversant wherein two carrier frequencies are generated by separate oscillators.

Certain prior art systems require phase correction of one modulating wave ahead of the modulator wherein the one modulating wave is modulated upon a carrier, and due to the fact that the two carrier waves are derived from two generators it is deemed necessary to interpolate a phase monitor ahead of the apparatus to be tested.

It is an object of our invention to simplify and render more accurate measurements of the kind set forth by modulating two cognate modulating frequencies upon a single carrier to produce a single sideband, whereby we eliminate possible errors arising from differences of frequency drift as between two generators. Further simplification is inherent in dealing with only one sideband instead of with two carriers each with two sidebands.

Another object is to use a low primary modulating frequency so that when it is multiplied to obtain a cognate secondary modulating frequency there will not be sufficient differential phase delay to give rise to ambiguities that would be present if that differential delay were more than $\pi$ radians.

The single figure of the drawing depicts in block diagram schematic form an embodiment of our invention.

One way in which a pulse or other transmission signal may become distorted is termed "delay distortion," and arises because the different frequency components of the signal are delayed to different degrees in traveling through the transmission system or device. If the phase versus frequency graph for the transmission system or device is a straight line (i.e., linear) then the rate of change of phase with frequency is a constant and all frequency components are equally delayed, and no differential delay distortion is introduced by the device or system considered. It is often necessary to measure the delay distortion produced by a system or a component thereof. The provision of a method and means for making such measurements accurately is the purpose of this invention.

Inasmuch as each of the functional units represented by a rectangle may be any one of the numerous devices for each respective function well known in the art it is deemed unnecessary to show circuitry details.

The oscillator 1 generates a wave of frequency $f_1$ which may be in the audio range. Part of the output of oscillator 1 is fed into frequency doubler 2 whereof the output has a frequency $2f_1$ which is, in adder 3, combined with the frequency $f_1$ from oscillator 1 to produce a wave having components $f_1$ and $2f_1$. Carrier frequency oscillator or generator 4 produces a wave of frequency $f_2$ which is, in single sideband modulator 5, modulated by the two frequencies from adder 3, to give an output having frequencies of $f_2+2f_1$ and $f_2+f_1$.

The output of single sideband modulator 5 is passed through the system, component or apparatus 6 whereof the differential phase delay is to be determined and wherein each component of the sideband will be impressed with a phase shift or delay. The phase shift measured in radians is herein designated $\phi_1$ for the $f_1$ sideband component and $\phi_2$ for the $2f_1$ component. The phase angle through which the $f_1$ component passes during transmission through the tested apparatus is $2\pi f_1 t + \phi_1$ radians or using standard notation of $2\pi f = \omega$, the angle is $\omega_1 t + \phi_1$. Likewise for the $2f_1$ component the angle is $2\omega_1 t + \phi_2$.

The two sideband components are detected in detector 7 after passing through the apparatus under test and transmitted to two filters 8 and 9, the former of which passes $f_1$ and the latter $2f_1$. The output of filter 8 is put through frequency doubler 10 which gives an output of $2f_1$ and with an angle of $2\omega t + 2\phi_1$. The angle of the output of filter 9 is $2\omega_1 t + \phi_2$. The outputs of filter 9 and frequency doubler 10 are fed into phase detector 11 which measures $\phi_2 - 2\phi_1$. This quantity represents the difference in phase for frequencies $f_1$ cycles apart, with a nominal center frequency of $f_2 + 1\frac{1}{2}f_1$. The resulting final output quantity may be read and plotted, or it may be displayed on a cathode ray oscilloscope screen, or presented in some other fashion.

Our invention has the following advantages over prior art techniques known to us:

Measurements may be made by a one-way transmission of signals;

A stable reference (oscillator or very narrow filter) is not required at the receiving end;

A separate communication link, or a "return loop" or "loop back," is not required for a reference signal;

It may be employed for one-way measurements at relatively low, e.g., audio, frequencies;

Measurements are possible without a continuously sweeping (in frequency) signal (i.e., "static" measurements are possible).

It is obvious that the frequencies that are multiplied may be multiplied by a factor of more than two, but by using a factor of no more than two it is possible to avoid more easily the ambiguity that may arise when the differential delay is more than $\pi$ radians. Also, within limits, it is possible to measure low frequencies with greater accuracy than the higher frequencies.

We claim:

1. A system for measuring differential phase delay in electrical apparatus, comprising circuitry to generate a single carrier wave, means to generate a first modulating wave of low frequency as compared to the frequency of the carrier, means to derive from the first modulating wave a second modulating wave of frequency double that of the first, means to add immediately the two modulating waves together, a single sideband modulator connected to modulate the two modulating waves upon the single carrier, apparatus to be tested connected to receive a single sideband carrying the two modulating frequencies, a detector connected to the output of the apparatus to detect the two modulating frequencies, means to separate the two modulating frequencies with the respective phase delay impressed upon each by the apparatus, means to double the first modulating frequency, and means connected to receive both the second modulating frequency and the doubled first modulating frequency and indicate the differential phase delay.

2. A system for measuring differential phase delay in electrical apparatus, comprising circuitry to generate a carrier wave, means to generate a first modulating wave, means to derive from the first modulating wave a second modulating wave of frequency double that of the first, means including a single sideband modulator to modulate the two modulating waves upon the carrier, apparatus to be tested connected to receive the modulated wave, a detector connected to the output of the apparatus to detect the modulating frequencies, means to separate the modulating frequencies with the respective phase-delay impressed upon each by the apparatus, means to double the first modulating frequency and its impressed phase delay, and means connected to receive the second modulating frequency and the doubled first modulating frequency and indicate the differential phase delay.

3. A system for measuring differential phase delay in electrical apparatus, said system comprising: first means for generating a carrier wave; second means for generating a first modulating wave; third means operable by said first modulating wave output of said second means for producing a second modulating wave of a frequency different than that of said first modulating wave but synchronously with said first modulating wave; fourth means for modulating said carrier wave with both of said first and second modulating waves; fifth means for impressing said modulated carrier wave on said electrical apparatus; sixth means for detecting the modulation of said carrier wave at the output of said electrical apparatus; seventh means responsive to the output of said sixth means for producing a first output signal of the same frequency as said first modulating wave and a second output signal of the same frequency as said second modulating wave; eighth means responsive to one of said first and second output signals for changing the frequency of said one signal to that of the other of said first and second output signals; and ninth means for detecting the difference in phase between the output signal of said eighth means and said other output signal.

4. A system for measuring differential phase delay in electrical apparatus, said system comprising: a source for producing an alternating carrier wave; a source for producing a first modulating wave; a first frequency changer responsive to said first modulating wave for producing a second modulating wave synchronously therewith of a frequency different from that of said first modulating wave; means for adding said first and second modulating waves together; a modulator responsive to said added first and second modulating waves and to said carrier wave for producing a carrier wave modulated with said first and second modulating waves; means for impressing said modulated carrier wave on said electrical apparatus; means for detecting the modulation of said carrier wave at the output of said electrical apparatus; a first filter responsive to the output of said detector means for pasisng a first output signal only of the frequency of said first modulating wave; a second filter responsive to the output of said detector means for passing a second output signal only of the frequency of said second modulating wave; a second frequency changer responsive to one of said first and second output signals for changing the frequency of said one signal to that of the other of said first and second output signals; and a phase detector for producing an output signal in accordance with the difference in phase between the output signal of said second frequency changer and said other output signal.

5. A system for measuring differential phase delay in electrical apparatus, said system comprising: a source for producing an alternating carrier wave of a predetermined frequency; a source for producing a first modulating wave of a frequency substantially lower than that of said predetermined frequency; a first frequency changer responsive to said first modulating wave for producing a second modulating wave synchronously therewith of a frequency different from that of said first modulating wave but still substantially smaller than that of said predetermined frequency; means for adding said first and second modulating waves together; a modulator responsive to said added first and second modulating waves and to said carrier wave for producing a carrier wave modulated with said first and second modulating waves; means for impressing said modulated carrier wave on said electrical apparatus; means for detecting the modulation of said carrier wave at the output of said electrical apparatus; a first filter responsive to the output of said detector means for passing a first output signal only of the frequency of said first modulating wave; a second filter responsive to the output of said detector means for passing a second output signal only of the frequency of said second modulating wave; a second frequency changer responsive to one of said first and second output signals for changing the frequency of said one signal to that of the other of said first and second output signals; and a phase detector for producing an output signal in accordance with the difference in phase between the output signal of said second frequency changer and said other output signal.

6. A system for measuring differential phase delay in electrical apparatus, said system comprising: a source for producing an alternating carrier wave; a source for producing a first modulating wave; a first frequency changer responsive to said first modulating wave for producing a second modulating wave synchronously therewith of a frequency different from that of said first modulating wave; means for adding said first and second modulating waves together; a single sideband modulator responsive to said added first and second modulating waves and to said carrier wave for producing a carrier wave modulated with said first and second modulating waves; means for impressing said modulated carrier wave on said electrical apparatus; means for detecting the modulation of said carrier wave at the output of said electrical apparatus; a first filter responsive to the output of said detector means for passing a first output signal only of the frequency of said first modulating wave; a second filter responsive to the output of said detector means for passing a second output signal only of the frequency of said second modulating wave; a second frequency changer responsive to one of said first and second output signals for changing the frequency of said one signal to that of the other of said first and second output signals; and a phase detector for producing an output signal in accordance with the difference in phase between the output signal of said second frequency changer and said other output signal.

7. A system for measuring a differential phase delay in electrical apparatus, said system comprising: a carrier frequency oscillator; a modulating frequency oscillator; a first frequency changer connected from the output of said modulating frequency oscillator; an adder connected from said modulating frequency oscillator and said first frequency changer; a single sideband modulator connected from said adder and said carrier frequency oscillator to said electrical apparatus; a detector connected from said electrical apparatus; a first filter connected from said detector to pass an output signal only of a frequency the same as that of the output signal of said modulating frequency oscillator; a second filter also connected from said detector to pass an output signal only of the frequency of the output signal of said first frequency changer; a second frequency changer responsive to one of said filter output signals for changing the frequency of one of said filter output signals to that of the other of said filter output signals; and a phase detector responsive to the output of said second frequency changer and to said other filter output signal to produce an output signal in accordance with the difference in phase between said other filter output signal and said second frequency changer output signal.

References Cited in the file of this patent

UNITED STATES PATENTS

| | | |
|---|---|---|
| 2,444,534 | Salinger | July 6, 1948 |
| 2,617,855 | Etheridge | Nov. 11, 1952 |
| 2,632,792 | Selz | Mar. 24, 1953 |
| 2,808,562 | French et al. | Oct. 1, 1957 |

OTHER REFERENCES

Ring: Bell System Tech. Journal, "Meas. of Delay Distortion in Microwave Repeaters," vol. 27, April 1948, pp. 247–264.